(12) United States Patent
Goto

(10) Patent No.: US 11,329,786 B2
(45) Date of Patent: May 10, 2022

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/571,457

(22) Filed: Sep. 16, 2019

(65) Prior Publication Data

US 2020/0099497 A1 Mar. 26, 2020

(30) Foreign Application Priority Data

Sep. 20, 2018 (JP) .............................. JP2018-176150

(51) Int. Cl.
*H04L 5/00* (2006.01)
*H04L 1/16* (2006.01)
*H04L 47/2466* (2022.01)

(52) U.S. Cl.
CPC .......... *H04L 5/0055* (2013.01); *H04L 1/1621* (2013.01); *H04L 1/1678* (2013.01); *H04L 47/2466* (2013.01)

(58) Field of Classification Search
CPC . H04L 5/0055; H04L 1/1621; H04L 47/2466; H04L 1/1678; H04L 47/323; H04L 1/1887; H04L 1/1607; H04L 1/1685; H04L 43/062; H04L 43/065; H04L 43/067; H04L 65/80; H04L 41/142; H04L 43/0835; H04L 43/0817; H04L 43/0829; H04L 1/16; H04L 1/0025; H04L 1/0027; H04L 29/06; H04L 1/0075; H04L 1/0675; H04L 5/0044; H04L 5/0094; H04L 69/10; H04L 69/22; H04L 69/324; H04L 1/1614; H04L 1/1671; H04L 5/0048; H04L 1/0083; H04L 29/02; H04B 17/309; H04B 17/26; H04B 17/318; H04B 7/0413; H04B 7/0452; H04B 7/063; H04W 24/02; H04W 24/04; H04W 24/08; H04W 72/0466; H04W 72/0413; H04W 84/12; H04W 80/02

See application file for complete search history.

(56) References Cited

U.S. PATENT DOCUMENTS

| | | | | |
|---|---|---|---|---|
| 2017/0310424 A1* | 10/2017 | Chun | ..................... | H04L 69/324 |
| 2017/0324488 A1* | 11/2017 | Yi | ......................... | H04W 24/04 |
| 2018/0020480 A1* | 1/2018 | Yang | ................... | H04W 72/042 |

FOREIGN PATENT DOCUMENTS

JP 2010028284 A 2/2010

\* cited by examiner

*Primary Examiner* — Hardikkumar D Patel
(74) *Attorney, Agent, or Firm* — Rossi, Kimms & McDowell LLP

(57) ABSTRACT

A communication apparatus transmits a first packet to each of a plurality of other communication apparatuses, and transmits a Multi-User Block Acknowledgement Request (MU-BAR) for causing the other communication apparatus among the plurality of other communication apparatuses, from which an Acknowledgement (ACK) to the first packet is not received at a predetermined timing after the transmission of the first packet, to transmit the ACK.

5 Claims, 6 Drawing Sheets

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a communication apparatus, a method of controlling the communication apparatus, and a non-transitory computer-readable storage medium.

Description of the Related Art

As a wireless communication system in which an access point and a wireless terminal communicate with each other, a wireless LAN (Local Area Network) adopting CSMA/CA (Carrier Sense Multiple Access/Collision Avoidance) is broadly known. In the IEEE802.11ac standard, which is a standard for such a wireless LAN, a DL-MU-MIMO (Down-Link Multi-User MIMO (Multi-Input Multi-Output)) technique, which is an extension of the MIMO technique, is adopted. In DL-MU-MIMO, the access point uses a technique called beamforming, so that it can transmit data to respective wireless terminals using beams spatially orthogonal to each other and, therefore, simultaneously transmit different data to a plurality of wireless terminals. This can improve the system throughput (Japanese Patent Laid-Open No. 2010-28284).

In order to further improve the efficiency, the task group of IEEE802.11ax, which is the successor to the IEEE802.11ac standard, has been studying techniques aimed at achieving higher efficiency. One of the candidate techniques among them is an UL-MU-MIMO (UpLink Multi-User MIMO) technique. In UL-MU-MIMO, the efficiency of uplink transmission can be improved by a plurality of wireless terminals transmitting data to an access point at the same timing using beams spatially orthogonal to each other.

In addition to MU-MIMO, OFDMA (Orthogonal Frequency Division Multiple Access) is also known as the multi-user transmission scheme, in which retransmission data and new data can be simultaneously transmitted from a plurality of wireless terminals. Note that in OFDMA, data from a plurality of wireless terminals are simultaneously received using a resource unit including one or several subcarriers as a communication resource of the minimum unit.

In DL-MU-MIMO in which packets are transmitted from an access point to a plurality of wireless terminals, consider a situation in which the access point cannot confirm a delivery Acknowledgment (ACK) from one or more of the plurality of wireless terminals. The reason why the access point cannot confirm the ACK may be that the packet does not reach the wireless terminal or the access point has missed the ACK. In any case, it is necessary to retransmit the packet to the plurality of wireless terminals. This can lead to wasted packet retransmissions.

SUMMARY OF THE INVENTION

In view of the above problem, the present invention provides a technique for improving the system throughput by performing control in accordance with the reception status of Acknowledgements (ACKs) to a transmitted packet.

According to one aspect of the present invention, there is provided a communication apparatus which comprises: a first transmission unit configured to transmit a first packet to each of a plurality of other communication apparatuses; and a second transmission unit configured to transmit a Multi-User Block Acknowledgement Request (MU-BAR) for causing the other communication apparatus among the plurality of other communication apparatuses, from which an Acknowledgement (ACK) to the first packet is not received at a predetermined timing after the transmission of the first packet, to transmit the ACK.

Further features of the present invention will become apparent from the following description of exemplary embodiments (with reference to the attached drawings).

DESCRIPTION OF THE EMBODIMENTS

The present invention will be described in detail below based on exemplary embodiments of the present invention with reference to the accompanying drawings. Note that arrangements illustrated in the following embodiments are merely examples, and the present invention is not limited to the illustrated arrangements. Note that IEEE Std 802.11 TM-2012, IEEE Std 802.11ac TM-2013, and IEEE802.11-15/0132r7 dated on Jul. 20, 2015 which is Specification Framework Document directed to IEEE Std 802.11ax as next generation wireless LAN standards, all of which are known as wireless LAN standards, are hereby incorporated by reference in their entirety.

First Embodiment (Configuration of System)

Figure 3:
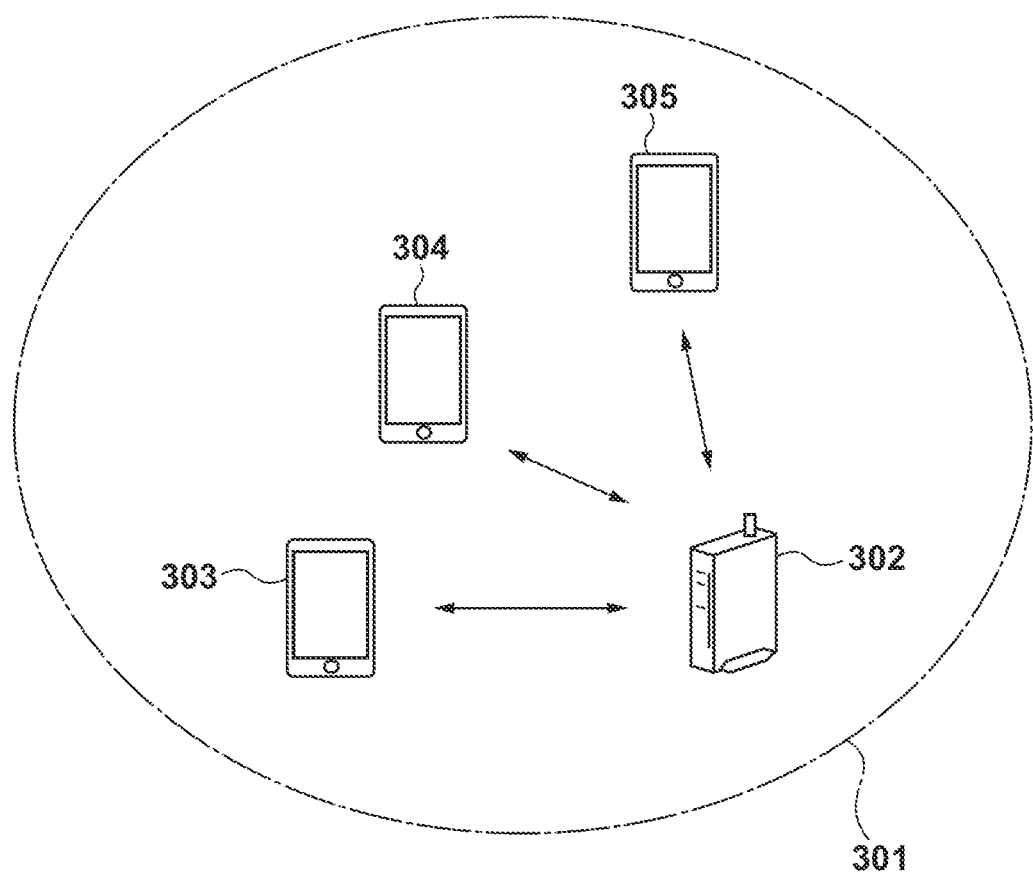
FIG. 3 is a view showing an example of the configuration of a wireless communication system.

FIG. 3 shows a wireless communication system in the first embodiment. The wireless communication system shown in FIG. 3 includes an access point (AP) 302 and a plurality of wireless terminals (STAs: stations) 303 to 305, and a wireless network 301 is formed by these apparatuses. The AP 302 can communicate with each of the STAs 303 to 305 in accordance with any wireless communication scheme complying with the IEEE802.11 series. Also, the AP 302 can establish a wireless link with each of the STAs 303 to 305 through a predetermined association process or the like. Note that the wireless communication scheme applicable to this embodiment is not limited to the scheme complying with the IEEE802.11 series, and any other scheme may be used as long as it is a wireless communication scheme capable of multi-user transmission.

(Arrangement of Apparatus)

Figure 1:
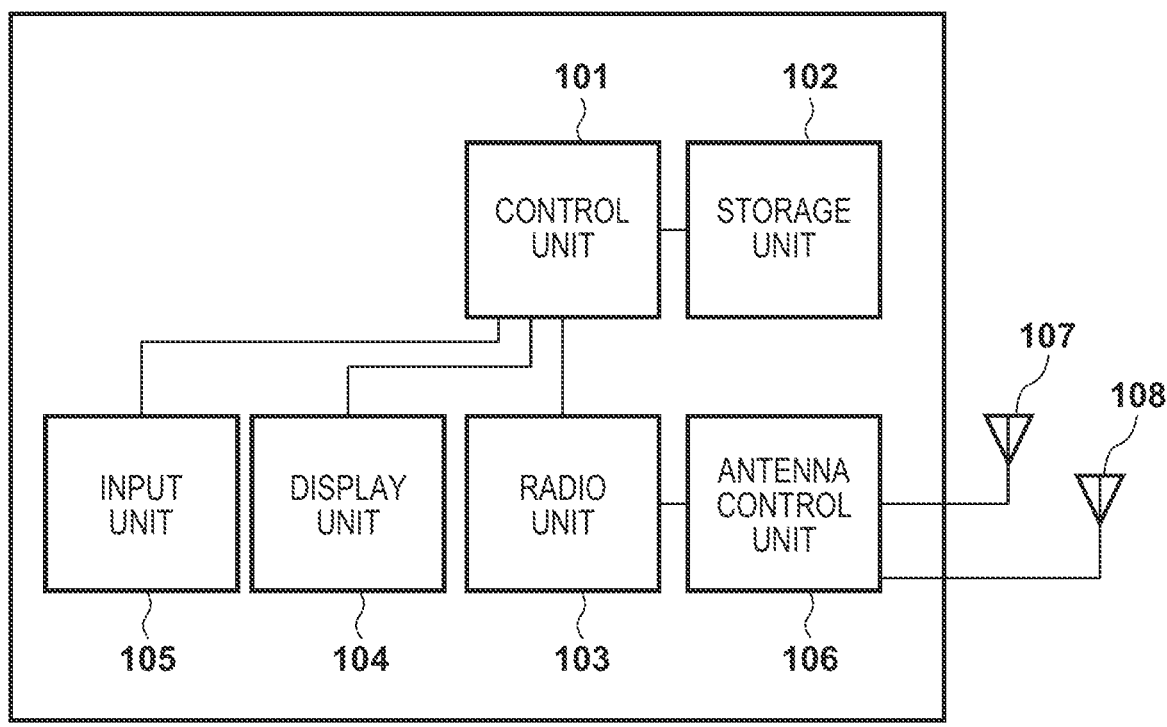
FIG. 1 is a view showing the hardware arrangement of a communication apparatus (each of an AP 302 and STAs 303 to 305)

FIG. 1 shows an example of the hardware arrangement of the communication apparatus (each of the AP 302 and the STAs 303 to 305) shown in FIG. 3. Note that the AP 302 is assumed to have the arrangement similar to those of the STAs 303 to 305 except that the AP 302 has a relay function. A control unit 101 controls the overall apparatus by executing control programs stored in a storage unit 102. The control unit 101 is formed by, for example, one or more CPUs (Central Processing Units). The storage unit 102 stores various kinds of information such as control programs executed by the control unit 101, image data, and communication parameters. Various operations to be described later can be performed by the control unit 101 executing the control programs stored in the storage unit 102. The storage unit 102 is formed by, for example, a storage medium such as a ROM, a RAM, an HDD, a flash memory, or a removable SD card. A radio unit 103 is formed by, for example, a chip that performs wireless communication, and performs wireless LAN communication complying with the IEEE802.11 series. A display unit 104 has a function capable of outputting visually perceivable information like an LCD (Liquid Crystal Display) or an LED (Light Emitting Diode), and performs various display operations. An antenna 107 and an antenna 108 are antennas capable of communication in the 2.4 GHz band and/or 5 GHz band for communication in a wireless LAN. An antenna control unit 106 controls the antennas 107 and 108. An input unit 105 receives various inputs from a user, and transmits a signal corresponding to the input to each component or stores the signal in a memory such as the storage unit 102.

Figure 2A:
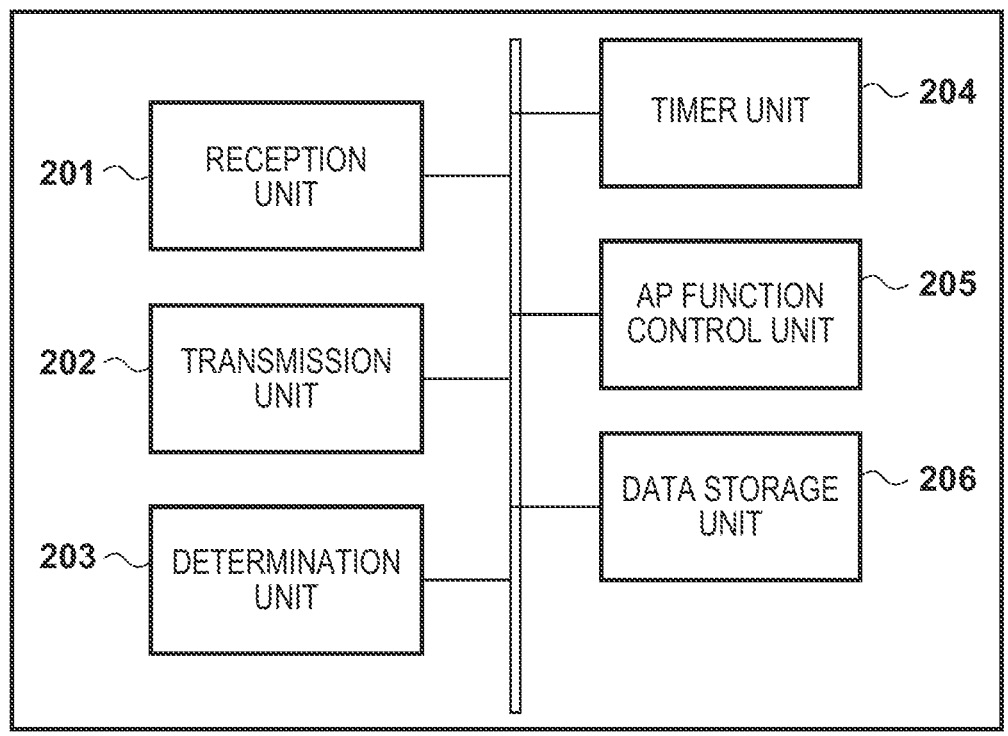
FIG. 2A is a view showing the software functional configuration of the AP 302.

FIG. 2A shows an example of the software functional configuration of the AP 302. Each functional block shown in FIG. 2A is stored as a program in the storage unit 102 of the AP 302, and the function can be implemented by the control unit 101 executing the program. Note that some or all of the plurality of functional blocks shown in FIG. 2A may be implemented as hardware. In this case, some or all of the plurality of functional blocks can be formed by, for example, an ASIC (Application Specific Integrated Circuit).

A reception unit 201 receives a signal transmitted from a transmission partner via the antenna 107 or the antenna 108 and the radio unit 103, and performs a decoding process or the like on the received signal. A transmission unit 202 performs an encoding process or the like on a signal to be transmitted, and transmits the signal over the air via the antenna 107 or the antenna 108. A determination unit 203 performs various determination processes on a signal received by the reception unit 201, and performs control such as determination of the type of a signal to be transmitted by the transmission unit 202. A timer unit 204 performs a time measurement process. The timer unit 204 measures, for example, a time (for example, a time T1 shown in FIGS. 5 and 6 to be described below) at which a packet to a delivery Acknowledgement (ACK) frame received from any of the STAs 303 to 305 is transmitted. An AP function control unit 205 implements control for uniquely operating as an access point complying with the IEEE802.11 series. A data storage unit 206 performs software control of the storage unit 102, and implements temporal storage of various kinds of information and succeeding packets, and the like.

Figure 2B:
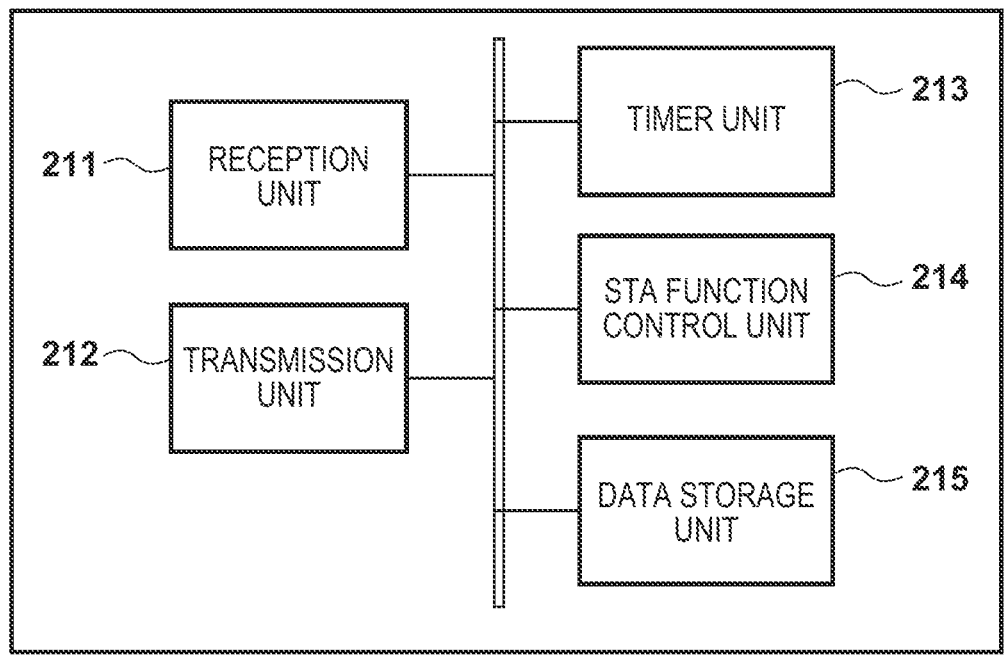
FIG. 2B is a view showing the software functional configuration of each of the STAs 303 to 305.

FIG. 2B shows an example of the software functional configuration of each of the STAs 303 to 305. Each functional block shown in FIG. 2B is stored as a program in the storage unit 102 of each of the STAs 303 to 305, and the function can be implemented by the control unit 101 executing the program. Note that some or all of the plurality of functional blocks shown in FIG. 2B may be implemented as hardware. In this case, some or all of the plurality of functional blocks can be formed by, for example, an ASIC.

A reception unit 211, a transmission unit 212, and a data storage unit 215 respectively have the function similar to that of the reception unit 201, the transmission unit 202, and the data storage unit 206 shown in FIG. 2A. A timer unit 213 performs a time measurement process. The timer unit 213 measures, for example, a time (for example, the time T1 shown in FIGS. 5 and 6 to be described below) at which an ACK to a data packet received from the AP 302 is transmitted. An STA function control unit 214 implements control for uniquely operating as a station complying with the IEEE802.11 series.

(Procedure of Processing)

Figure 4:
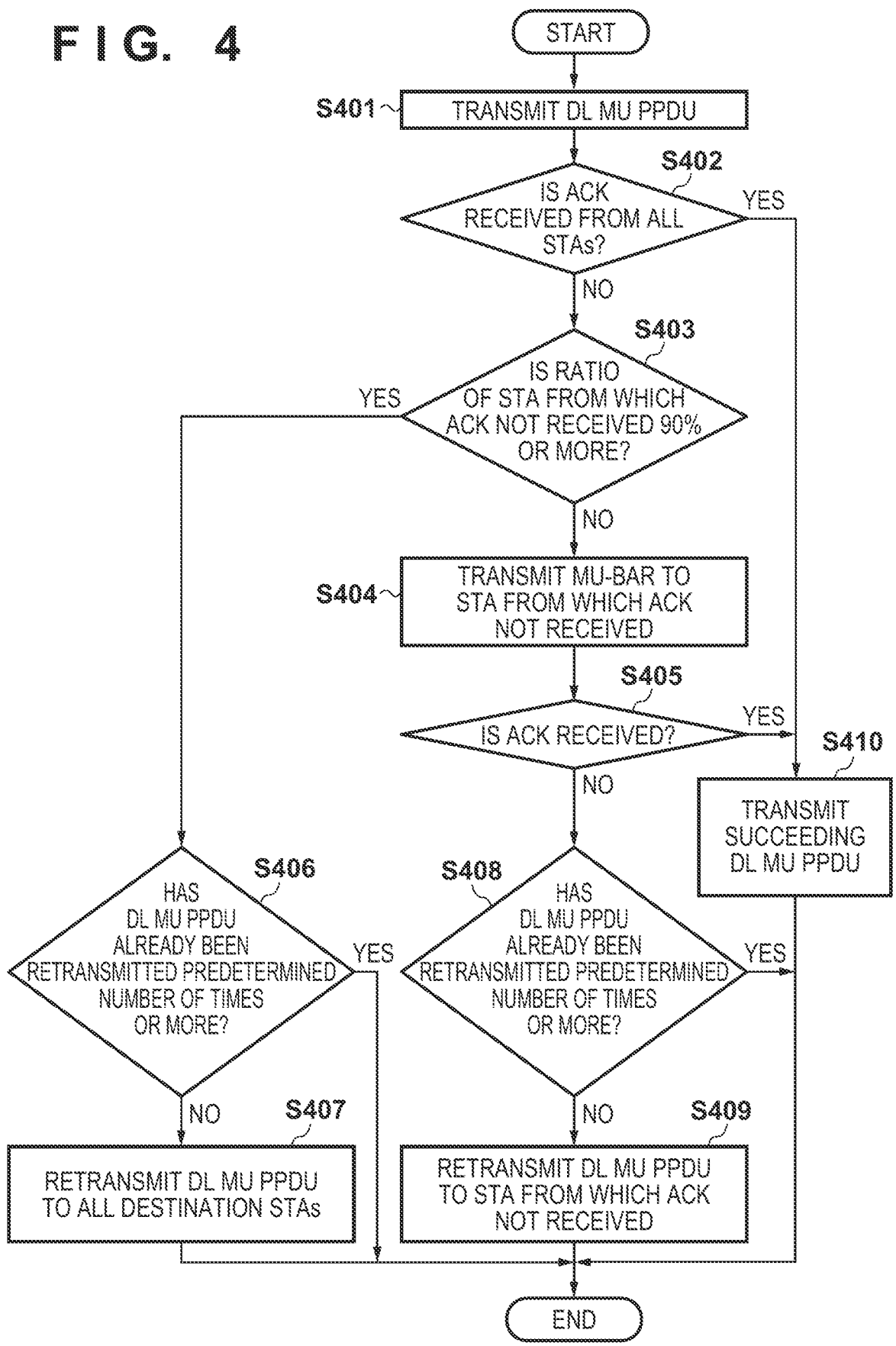
FIG. 4 is a flowchart showing the operation of the AP 302 in the first embodiment.

Next, the operation of the AP 302 in this embodiment will be described with reference to FIG. 4. FIG. 4 is a flowchart showing the operation of the AP 302 in this embodiment. The flowchart illustrated in FIG. 4 can be implemented when the control unit 101 of the AP 302 executes control programs stored in the storage unit 102 to execute calculation and processing of information and control of the respective hardware components. Note that the AP 302 is assumed to be already associated with each of the STAs 303 to 305.

The transmission unit 202 of the AP 302 transmits a DL MU PPDU to the associated STAs 303 to 305 (step S401). The DL MU PPDU is a downlink (DL) multi-user (MU) PLCP protocol data unit (PPDU) from the AP 302 to the STAs 303 to 305, and is a wireless packet that can be transmitted using DL MU-MIMO and DL OFDMA. If the reception unit 201 receives a delivery Acknowledgement (ACK) frame to the DL MU PPDU from each of the STAs 303 to 305 at a predetermined timing after the transmission of the DL MU PPDU by the transmission unit 202 (YES in step S402), the transmission unit 202 transmits a succeeding DL MU PPDU (step S410). That is, if the AP 302 receives the ACKs from all STAs to which it has transmitted the DL MU PPDU, the AP 302 transmits the succeeding DL MU PPDU.

On the other hand, if the reception unit 201 cannot receive the ACK to the DL MU PPDU from any one or more of the STAs 303 to 305 at the predetermined timing after the transmission of the DL MU PPDU by the transmission unit 202, the process advances to step S403. That is, if the AP 302 cannot receive the ACK from one or more of the STAs to which it has transmitted the DL MU PPDU, the process advances to step S403. In step S403, the determination unit 203 determines whether the ratio of the number of ACKs that cannot be received by the reception unit 201 to the number of destinations of the transmitted DL MU PPDU is equal to or larger than a predetermined ratio. That is, the determination unit 203 determines whether the ratio of the number of STAs (to be referred to as ACK unreceived STAs, hereinafter) from which ACKs are not received to the total number of STAs to which the DL MU PPDU has been transmitted is equal to or higher than the predetermined ratio. In the example shown in FIG. 4, the predetermined ratio is set to 90%. If the ratio of the ACK unreceived STAs is 90% or more (YES in step S403), the determination unit 203 further determines whether the transmission unit 202 has retransmitted the DL MU PPDU a predetermined number of times or more (step S406). If the DL MU PPDU has been retransmitted the predetermined number of times or more (YES in step S406), the transmission unit 202 terminates the process without transmitting the DL MU PPDU again. If the DL MU PPDU has not been retransmitted the predetermined number of times or more (NO in step S406), the transmission unit 202 retransmits the DL MU PPDU to the STAs 303 to 305 (step S407).

If the ratio of the ACK unreceived STAs is lower than 90% (NO in step S403), the transmission unit 202 transmits an MU-BAR (Multi-User Block Acknowledgment Request) frame. The MU-BAR is a frame for designating a plurality of STAs and requesting them to transmit the ACKs. After the transmission unit 202 transmits the MU-BAR, if the reception unit 201 receives the ACKs from the ACK unreceived STAs (YES in step S405), the transmission unit 202 transmits the succeeding DL MU PPDU (step S410). If the reception unit 201 cannot receive the ACKs from the ACK unreceived STAs (NO in step S405), the determination unit 203 determines whether the transmission unit 202 has retransmitted the DL MU PPDU a predetermined number of times or more (step S408). If the DL MU PPDU has been retransmitted to the ACK unreceived STAs the predetermined number of times or more (YES in step S408), the transmission unit 202 terminates the process without transmitting the DL MU PPDU again. If the DL MU PPDU has not been retransmitted to the ACK unreceived STAs the predetermined number of times or more (NO in step S408), the transmission unit 202 retransmits the DL MU PPDU to the ACK unreceived STAs (step S409).

Figure 5:
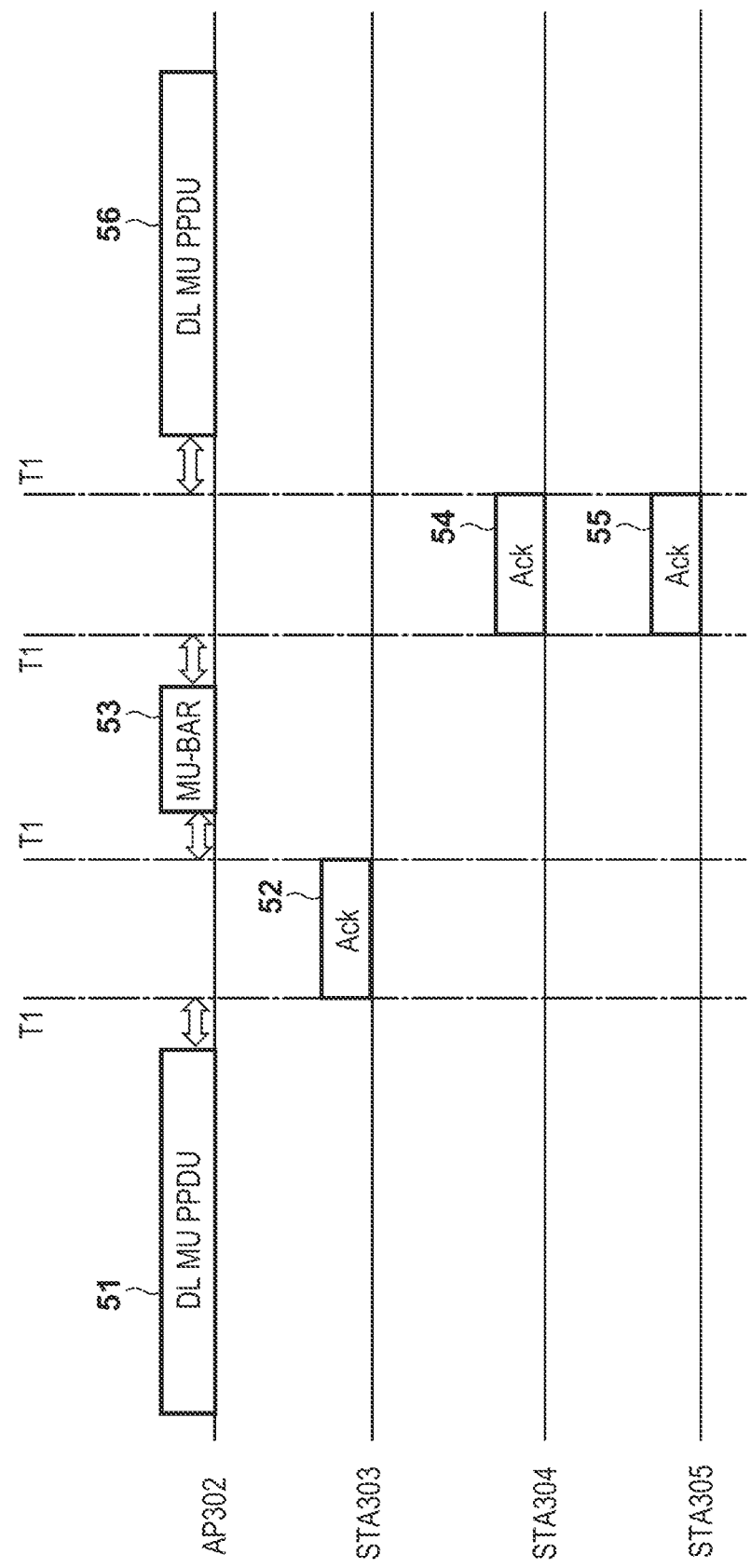
FIG. 5 is a sequence chart showing the operation performed between the AP 302 and the STAs 303 to 305 in the first embodiment.

FIG. 5 is a sequence chart showing the operation performed between the AP 302 and the STAs 303 to 305 in this embodiment. The AP 302 transmits a DL MU PPDU 51 to each of the STAs 303 to 305 as DL-MU-MIMO transmission. Each of the STAs 303 to 305 that has received the DL MU PPDU 51 transmits an ACK when the predetermined time T1 has elapsed. The time T1 may be an SIFS (a short interframe space defined in the IEEE802.11 standard), or may be a time determined separately. In the example shown in FIG. 5, it is assumed that an ACK 52 transmitted from the STA 303 reaches the AP 302 but ACKs transmitted respectively from the STA 304 and the STA 305 do not reach the AP 302.

The AP 302 that cannot confirm the ACKs from the STA 304 and the STA 305 transmits an MU-BAR 53 to each of the STA 304 and the STA 305 alone when the predetermined time T1 has elapsed. The STA 304 and the STA 305 that have received the MU-BAR 53 designating the STA 304 and the STA 305 from the AP 302 transmit an ACK 54 and an ACK 55 respectively when the predetermined time T1 has elapsed. The AP 302 having received the ACK 54 and the ACK 55 can confirm the ACKs from all the stations (STAs 303 to 305), and thus transmits a DL MU PPDU 56 which is a packet succeeding the packet transmitted using the DL MU PPDU 51.

As described above, according to this embodiment, it is possible to transmit a succeeding packet (DL MU PPDU) after reliably confirming the delivery Acknowledgment (ACK) in a multi-user environment, so that the system throughput can be improved.

Second Embodiment

In the first embodiment, the AP 302 improves the overall system throughput by individually transmitting the MU-BAR to the STA for which the ACK cannot be confirmed. In the second embodiment, an example in which a DL MU PPDU and an MU-BAR are superimposed and transmitted will be described. The parts different from those in the first embodiment will be described below.

Figure 6:
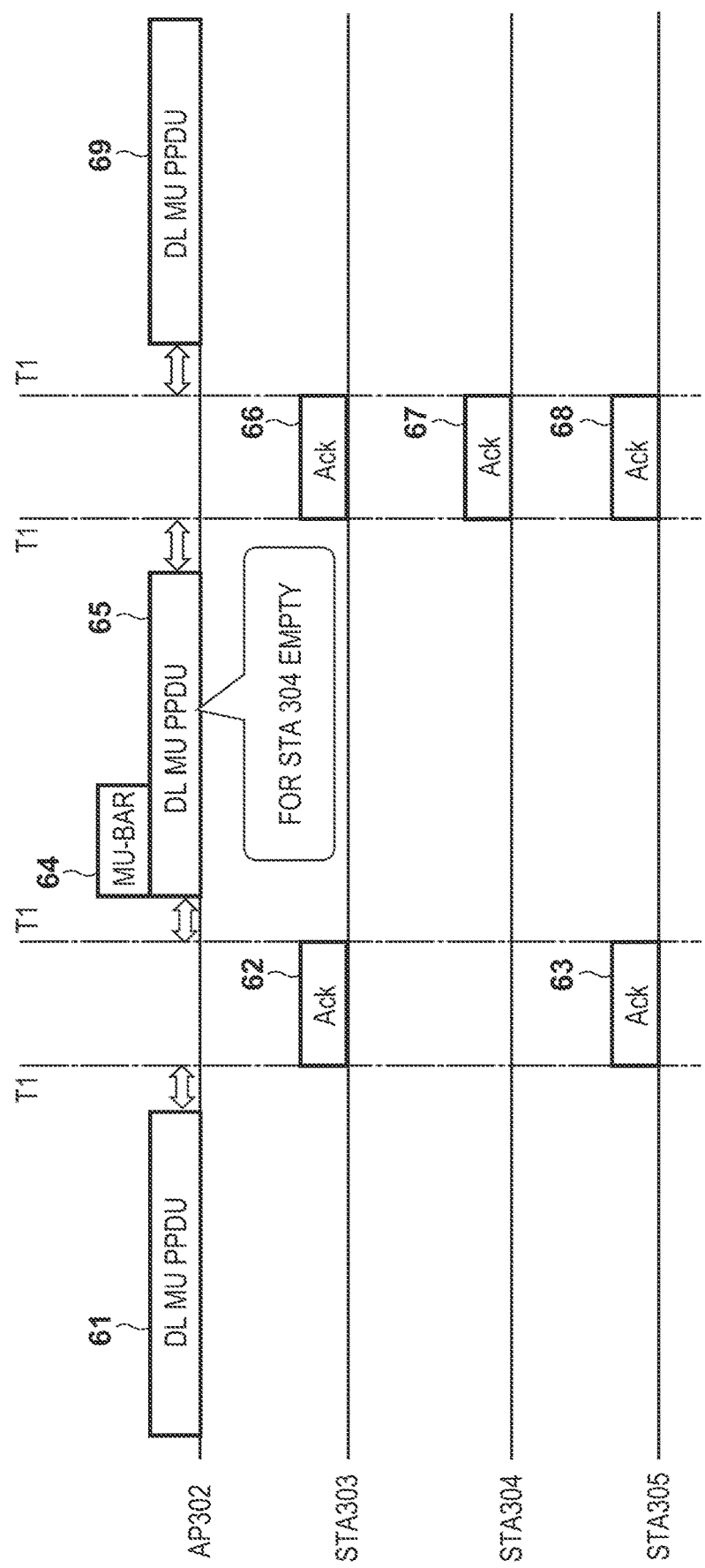
FIG. 6 is a sequence chart showing the operation performed between an AP 302 and STAs 303 to 305 in the second embodiment.

The operation of the AP 302 in this embodiment is similar to the operation shown in the flowchart illustrated in FIG. 4 except that transmission of an MU-BAR and transmission of a succeeding DL MU PPDU are performed in parallel. FIG. 6 is a sequence chart showing the operation performed between an AP 302 and STAs 303 to 305 in this embodiment. The AP 302 transmits a DL MU PPDU 61 to each of the STAs 303 to 305 as DL-MU-MIMO transmission. Each of the STAs 303 to 305 that has received the DL MU PPDU transmits an ACK when a predetermined time T1 has elapsed. As described in the first embodiment, the time T1 may be an SIFS or may be a time determined separately. In the example shown in FIG. 6, it is assumed that an ACK 62 and an ACK 63 transmitted respectively from the STA 303 and the STA 305 reach the AP 302 but an ACK transmitted from the STA 304 does not reach the AP 302.

The AP 302 that cannot confirm the ACK from the STA 304 transmits an MU-BAR 64 to the STA 304 alone when the predetermined time T1 has elapsed. At this time, the AP 302 simultaneously transmits a DL MU PPDU 65 succeeding the DL MU PPDU 61 to the STAs 303 and 305 for which the ACKs have been confirmed. That is, the AP 302 transmits a packet in which the MU-BAR 64 for the STA 304 and the DL MU PPDU 65 for the STA 303 and the STA 305 are superimposed. However, the AP 302 does not transmit information for the STA 304 in the DL MU PPDU 65. The STAs 303 to 305 that have received the superimposed packet including the DL MU PPDU 65 and the MU-BAR 64 from the AP 302 transmit ACKs 66 to 68 respectively when the predetermined time T1 has elapsed. In response to this, the AP 302 transmits a DL MU PPDU 69. The DL MU PPDU 69 serves as a packet succeeding the DL MU PPDU 65 for the STAs 303 and 305, and serves as a packet succeeding the DL MU PPDU 61 for the STA 304.

According to this embodiment, it is possible to transmit a delivery Acknowledgement request (MU-BAR) and a succeeding packet (DL MU PPDU) in a multi-user environment, so that the system throughput can be further improved compared with the first embodiment.

Third Embodiment

In the first embodiment, the AP 302 improves the overall system throughput by individually transmitting the MU-BAR to the STA for which ACK cannot be confirmed. In the second embodiment, the overall system throughput is improved by transmitting the MU-BAR and the succeeding DL MU PPDU in a superimposed manner (simultaneously). In this embodiment, an example will be described in which individual transmission of an MU-BAR as in the first embodiment and superimposed transmission of an MU-BAR and a DL MU PPDU as in the second embodiment are switched based on a predetermined condition. The parts different from those in the first embodiment and the second embodiment will be described.

(1) User Setting

Individual transmission of an MU-BAR and superimposed transmission of an MU-BAR and a DL MU PPDU are switched in accordance with a user setting. In this case, for example, an input unit 105 (shown in FIG. 1) of an AP 302 dynamically or fixedly receives the setting from the user, so that switching between individual transmission of an MU-BAR and superimposed transmission of an MU-BAR and a DL MU PPDU is possible.

(2) Capability of STA

Individual transmission of an MU-BAR and superimposed transmission of an MU-BAR and a DL MU PPDU are switched in accordance with the capability of the STA. The capability of the STA is, for example, the capability of the STA to receive a signal in which an MU-BAR and a DL MU PPDU are superimposed. The AP 302 can confirm (determine) the presence or absence of the capability by a signal received from each STA. In this case, if the AP 302 can confirm that all STAs to which a DL MU PPDU and an MU-BAR are to be transmitted have the capability, superimposed transmission of an MU-BAR and a DL MU PPDU may be performed; otherwise, individual transmission of an MU-BAR may be performed. Alternatively, for example, if the AP 302 can confirm that all STAs in connection with it have the capability, superimposed transmission of an MU-BAR and a DL MU PPDU may be performed; otherwise, individual transmission of an MU-BAR may be performed.

(3) Reception Status of ACK

Individual transmission of an MU-BAR and superimposed transmission of an MU-BAR and a DL MU PPDU are switched in accordance with the reception status of the first ACK. For example, referring to the examples shown in FIGS. 5 and 6, the AP 302 switches between individual transmission of an MU-BAR and superimposed transmission of an MU-BAR and a DL MU PPDU based on the number (radio) of STAs among the transmission destinations of the DL MU PPDU, from which the first ACKs (an ACK 52 or ACKs 62 and 63) have been received. In this case, the AP 302 may perform superimposed transmission of an MU-BAR and a DL MU PPDU if the ACKs are received from a half or more of the transmission destinations of the DL MU PPDU; otherwise, it may perform individual transmission of an MU-BAR. Alternatively, the AP 302 may perform superposition transmission of an MU-BAR and a DL MU PPDU if the ACKs are received from a predetermined number of transmission destinations of the DL MU PPDU; otherwise, it may perform individual transmission of an MU-BAR.

As described above, according to this embodiment, it is possible to improve the system throughput in MU communication in accordance with the situation, by switching between individual transmission of an MU-BAR and superimposed transmission of an MU-BAR and a DL MU PPDU based on a predetermined condition.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-176150, filed Sep. 20, 2018, which is hereby incorporated by reference herein in its entirety.

What is claimed is:

1. A communication apparatus comprising:
one or more processors; and
one or more memories storing instructions that, when executed by the one or more processors, cause the communication apparatus to:
transmit a first packet to each of a plurality of other communication apparatuses;
transmit a Multi-User Block Acknowledgement Request (MU-BAR) for causing one or more communication apparatuses among the plurality of other communication apparatuses, from each of which an Acknowledgement (ACK) to the first packet is not received within a predetermined time period after the transmission of the first packet, to transmit the ACK, in a case where a ratio of a number of the one or more communication apparatuses from each of which the ACK is not received within the predetermined time period to a total number of the plurality of other communication apparatuses is less than a predetermined ratio; and
retransmit the first packet to each of the plurality of other communication apparatuses without the MU-BAR being transmitted in a case where the ratio is not less than the predetermined ratio.

2. The apparatus according to claim 1, wherein the execution of the instructions further causes the communication apparatus to:
transmit a second packet succeeding the first packet to each of the plurality of other communication apparatuses after ACKs are received from all of the plurality of other communication apparatuses.

3. The apparatus according to claim 1, wherein the execution of the instructions further causes the communication apparatus to:
in a case where the ACK is not received, even after the transmission of the MU-BAR, from the one or more communication apparatuses from each of which the ACK is not received within a predetermined time period after the transmission of the first packet, retransmit the first packet to the one or more communication apparatuses from each of which the ACK is not received.

4. The apparatus according to claim 1, wherein the retransmission of the first packet is performed if a number of retransmissions of the first packet is smaller than a predetermined number.

5. The apparatus according to claim 1, wherein the apparatus complies with IEEE802.11 series.

* * * * *